United States Patent
Kim et al.

(10) Patent No.: US 6,645,519 B2
(45) Date of Patent: Nov. 11, 2003

(54) METHOD FOR PRODUCING TAURINE-ENRICHED MILK

(75) Inventors: Dong Shin Kim, Daegu (KR); Dong Jin Park, Kyungju (KR)

(73) Assignee: Gyeong-Buk Daegu Dairy Co-Operatives (KR)

( * ) Notice: Subject to any disclaimer, the term of this patent is extended or adjusted under 35 U.S.C. 154(b) by 117 days.

(21) Appl. No.: 10/017,052

(22) Filed: Dec. 13, 2001

(65) Prior Publication Data

US 2002/0110589 A1 Aug. 15, 2002

(30) Foreign Application Priority Data

Dec. 14, 2000 (KR) ........................................ 2000-007651

(51) Int. Cl.[7] .............................. A23K 1/18; A23K 1/17; A61K 47/00
(52) U.S. Cl. ........................ 424/438; 424/439; 424/442
(58) Field of Search ................................. 424/438, 439, 424/442

(56) References Cited

U.S. PATENT DOCUMENTS

| 4,181,708 A | 1/1980 | Dannelly |
| 5,279,832 A | 1/1994 | Greissinger et al. |
| 5,766,483 A | 6/1998 | Luly et al. |

OTHER PUBLICATIONS

Papas et al, "Response of Lambs to Oral or Aomasal Spplementation of Mehionine Hdroxy Aalog or Methionine", Dep. Anima. Sco., Univ Illinois, Urbana, II, USA, Journal of Nutrition, (1974), 104(6), 653–9.*

J. Rigo and J. Senterre, Is Taurine Essential for the Neonates? Biol. Neonates, 32:73–76, 1997.

Picone, Taurine Update: Metabolism and Function, NUTRITION TODAY, Jul./Aug. 1987, pp 16–20.

Chalupa, Rumen bypass and protection of proteins and amino acids, JOURNAL OF DAIRY SCIENCE, vol. 58, No. 8, 1974, pp 1198–1218.

Chen et al., Determination of taurine in biological samples by reversed-phase liquid chromatography with precolumn derivation with dinitrofluorobenzene, ANALYTICA CHIMICA ACTA, 296, 1994, pp 249–253.

Mehaia et al., Taurine and other free amino acids in milk of camel, goat, cow and man, MILCHWISSENSCHAFT, 47(6), 1992, pp 351–353.

Jacobsen et al., Biochemistry and physiology of taurine and taurine derivatives, PHYSIOL. REV. vol. 48, No. 2, 1968, pp 424–511.

(List continued on next page.)

*Primary Examiner*—Carlos Azpuru
(74) *Attorney, Agent, or Firm*—Akerman Senterfitt

(57) ABSTRACT

The present invention relates to a method for the production of natural taurine-enriched milk using biological metabolism, in which a precursor for synthesis of taurine is prepared in the shape of a pallet or matrix resistant to degradation in the rumen of ruminants and added to a feedstuff, such that biosynthesis of taurine is induced by stimulation of a substrate. According to the method of the present invention, methionine or methionine precursor which is the precursor for taurine synthesis is coated with additives including an inert material and a filler, and thus protected from a rumen pH and an enzymatic action of rumen microorganisms. As a result, problems of the rumen degradation and the metabolism obstruction can be solved. Taurine-enriched milk according to the present invention contains taurine at a higher concentration than general milk, and hence, can be effectively used for the preparation of functional baby foods, and for the preparation of health foods.

11 Claims, 7 Drawing Sheets

OTHER PUBLICATIONS

Vinton et al., Taurine concentrations in plasma, blood cells, and urine of children undergoing long–term parenteral nutrition, PEDIATR. RES. vol. 21, No. 4, 1987, pp 399–403.

Rasssin et al., Taurine and other free amino acids in milk of man and other mammals, EARLY HUM. DEV. 2(1), 1978, pp 1–13.

Sarwar et al., Free amino acids in milks of human subjects, other primates and non–primates, BRITISH JOURNAL of NUTRITION 79, 1998, pp 129–131.

Rassin et al., Feeding the Low–Birth–Weight Infant: II. Effects of Taurine and Cholesterol Supplementation on Amino Acids and Cholesterol, PEDIATRICS, vol. 71, No. 2, 1983, pp 179–186.

Zelikovic et al., Taurine depletion in very low birth weight infants receiving prolonged total parenteral nutrition: Role of renal immaturity, JOURNAL of PEDIATRICS, 116, Feb. 1990, pp 301–306.

* cited by examiner

METHOD FOR PRODUCING TAURINE-ENRICHED MILK

BACKGROUND OF THE INVENTION

1. Field of the Invention

The present invention relates generally to a method for the production of animal milk having a high taurine content, and more particularly to a method for the production of natural taurine-enriched milk using biological metabolism, in which a precursor for synthesis of taurine is prepared in the as form of a pallet or matrix resistant to degradation in the rumen of ruminants and added to feedstuffs, such that biosynthesis of taurine is induced by stimulation of a substrate.

2. Description of the Prior Art

Taurine (2-amino-ethanesulfonic acid) is a sulfonic amino acid which is biologically synthesized in the body of mammals. This exists in a state free from intracellular fluids, and is found in skeletal muscles, such as cerebrum, eyeball, muscles, liver and the like, free amino acid groups and at high concentrations. Taurine has been used long in foods and drinks as a health additive having various functional characteristics, such as improvement of the liver function through detoxication and antioxidation actions, decreased blood cholesterol, and blood pressure adjustment. It was reported that taurine is combined with a bile acid in the body of predatory animals and is released through the bile in the form of taurocholic acid. In this case, taurine released into the bile has the effect of accelerating absorption of fat or fat-soluble vitamin in the intestine by a surface-active action. Also, it is effective in mitigating jaundice upon acute hepatitis by choleretic action, and in reducing blood neutral fat and cholesterol values in patients with hyperlipidemia. In addition, it was reported that taurine has a variety of functions, such as cerebral development, activation of photoreceptors of retina, reproduction, normal growth and development, antioxidant activity, and neural transmission, etc. (See, Jacobsen et al., *Physiol. Rev.* 48:424–511, 1968).

Because of such biological activities, taurine is used as an additive in various health foods or medical supplies, such as weaning diets for babies, gums, drinks, and nutritious tonic drinks, but is not practically used as drugs. Also, its reported therapeutic use was only for therapy of heart diseases.

In mammalian tissues, taurine is biologically synthesized from cysteine and methionine, that are sulfonic amino acids. In the case of the human body, however, the biological synthesis of taurine does not nearly occur, since activities of cysteine dioxygenase and cysteine decarboxylase involved in the biosynthesis of taurine is very low. As a result, the human body must be supplied with taurine externally (See, Vinton et al., *Pediatr. Res.* 21:399–403, 1987).

Meanwhile, taurine is maintained in mammalian tissues at high concentrations at nearly constant levels, but the taurine content in animal milk significantly varies depending on the kind of animal. According to results of the measurement of concentration of taurine in mature milk obtained from a variety of mammals (see, Rassin et al., *Early Hum. Dev.* 2(1):1–13; and Sarwar et al., *British Journal of Nutrition* 79:129–131, 1988), mature milks obtained from a zebra and a cat contain taurine levels of 595 $\mu$mol/100 ml and 287 $\mu$mol/100 ml, respectively, which are the highest concentrations among free amino acids contained in animal milk. Mother's milk contains taurine of 34 $\mu$mol/ml, which is next to glutamate in concentration. Meanwhile, mature milks from rats, rabbits and a sheep contain taurine of 14–15 $\mu$mol/100 ml, while cow' milk contains taurine of 1 $\mu$mol/100 ml which is the lowest among the contents of taurine in milk of mammals. In particular, taurine in mother's milk is a major amino acid, forming about 13% of the total free amino acids, whereas milk that is a main component of processed milk powder has the relatively low taurine content.

Because of such a low taurine content in milk, it was reported that a blood taurine level of immature infants and infants who ingest processed milk powder is reduced compared with infants who ingests mother's milk (see, Rassin et al., *Pediatrics* 71:179–186, 1983; and Rigo et al., *Biol. Neonates* 32:73–76, 19970), although there was no clinical report of a taurine deficiency disease in adults who normally ingest meals. Also, the taurine reabsorption ability of babies is low due to the immaturity of renal tubules (Zelikovic et al., *J. Pediatr.* 116:301–306, 1990), while requirements for taurine is increased due to rapid growth of the body. As a result, for healthy growth and development, there is a need by babies for taurine. In particular, babies are significantly weak in synthesis, secretion and reuse of bile acids and have problems in digestion and absorption abilities of lipids. For this reason, emulsification of lipids will be insufficient, which is required to rapidly decompose the ingested lipids by pancreas lipase. Furthermore, as mother's milk contains bile acid-stimulating lipase, it can efficiently decompose lipids with pancreas lipase even in an environment of low bile acid. However, processed milk for babies does not contain such a bile acid-stimulating lipase. Accordingly, in order to overcome the problems with processed milk powder, in the United States, taurine, which is effective in accelerating the absorption of fat or fat-soluble vitamins by a surface active action is added to processed milk powder so as to have the same taurine level as mother's milk (Picone et al., *Today* July/Aug: 16–20, 1987). Moreover, the processed milk powder for infants now sold in Korea contains additionally enriched taurine.

Producing methods of taurine used for various applications includes a natural taurine-extracting method and a chemical synthesis method. The natural taurine-extracting method is a method of extracting a taurine component from mollusks, such as cuttlefish, octopus, shellfish and the like. However, although products obtained by the natural taurine-extracting method can be used in various applications including table use or medical use, they are small portion (about 1%) relative to all taurine products. Taurine products obtained by the chemical synthesis method are mainly used.

The chemical synthesis method includes a variety of methods. In the latter method, however, other impurities can be contained during the process of producing synthesized taurine and cannot be completely removed during the process of purifying the synthesized taurine. As a result, the synthesized taurine has limited use due to the remaining impurities. In particular, the inexpensive taurine cannot be used for table use.

Therefore, there is an increased need for natural taurine which can be used in various applications including table use and medical use. There was a method proposed which included recovering waste liquid including an exuvial and cooking fluid of a cuttlefish and producing a taurine-containing product (Korean Patent Laid-Open No. 00-58466). Also, a method of producing an egg containing taurine in a large amount was proposed, which comprised drying and powdering a wasted shell portion of a crab excluding the edible portion thereof and adding the resulting powder to animal feedstuffs (Korean Patent Publication No. 96-16856).

However, the above methods in which taurine is added directly to products, or the feedstuffs containing taurine in a large amount is supplied directly so as to produce products such as foods containing taurine in great quantities, have problems as described below. First, a problem with the methods in which taurine is added directly to products is that it reduces productivity since the amount of taurine supplied by the natural taurine-extracting methods described above is very low.

In addition, a problem with methods in which the feedstuffs containing taurine in great quantities are supplied directly is that, where it is applied to animals having rumen, the taurine is degraded by microbes present in the rumen so that it is difficult to produce products containing taurine at a desired level. Generally, a digestion process of nutrients in the ruminants having rumen is divided into a first step of fermentation by the microbes in the rumen, and a second step of digestion in the lower digestion organ. For this reason, nutrients which are effectively available in the ruminants, are formed by combining the total microbial nutrients synthesized in the rumen and nutrients transferred to the small intestine without degradation in the rumen. Meanwhile, the rumen microbes have strong proteolytic and deamination activities and thus rapidly decompose liquid proteins and amino acids, so that there are fears in which taurine contained in the animal feedstuffs, or a precursor amino acid for taurine synthesis, can be degraded in the rumen. Thus, many studies have been carried out to find methods of reducing the degree of degradation of proteins and amino acids in the rumen. As a result, methods, such as chemical treatment, utilization of amino acid analogue, encapsulation, esophageal groove closure, and selective operation of rumen metabolism pathway balance, etc. are used (Chalupa et al., *J. Dairy Science* 58(8):1198–1218, Chen et al., *Analytical Chimica Acta* 296:249–253, 1004).

Another problem with the method where taurine is added directly to the feedstuffs and fed to the animals, is that when an excess of taurine is present in vivo, rumen metabolism, and digestion and absorption after the rumination can be obstructed.

In order to solve the problems with the taurine supply according to the prior art and to produce milk having an increased content of taurine, the present inventors have prepared a precursor for taurine synthesis in a form resistant to degradation in the rumen and fed the prepared precursor to the animals, so that the taurine synthesis is induced in vivo, thereby producing a taurine-enriched milk. The precursor for taurine synthesis is sulfuric amino acids, such as cystein and methionine, that are necessary for animal protein metabolism and evaluated as first restriction amino acids, particularly for milk protein synthesis. Tissue, blood, urine and milk of the ruminants are low in taurine and cystein contents, in comparison with those of monogastric animals. This is caused by hereditary or physiological factors, and because all ruminants are grass-eating animals and the vegetable protein ingested by them is short of taurine and taurine sources. From this fact, where rumen degradation-protected methionine, which is not degraded and is absorbable in the small intestine, is additionally fed, there can be expected an increase in taurine content together with change in composition of milk protein by stimulation of a substrate. In other words, for the intestinal absorption of these amino acids involved in synthesis of taurine and secretion of taurine through milk, rumen bypass and protection of these amino acids from rumen degradation are important. For this, chemical treatment and encapsulation methods are expected to be effective.

There have been many studies conducted on pellets or methods of producing the same containing active ingredients, such as amino acids which are protected from degradation in the rumen of ruminants, as well as animal feedstuffs containing the pellets. However, these studies aim to improve the breeding method of ruminants through feeding of the active ingredients (Korean Patent Laid-Open No. 95-27379, Korean Patent No. 143766, U.S. Pat. No. 5,279,832, U.S. Pat. No. 4,181,708, and U.S. Pat. No. 5,776,483). There are no reports on the production of milk containing increased amounts of taurine, through feeding of the protected amino acids to the animals.

Therefore, the present invention is to provide a method of producing taurine-enriched milk using a biological metabolic pathway, in which pellet or matrix containing amino acids that are protected from degradation in the rumen of ruminants are added to animal feedstuffs, such that synthesis of taurine is induced by stimulation of a substrate.

SUMMARY OF THE INVENTION

It is a general object of the present invention to provide a production method increasing the content of taurine in milk, in which taurine is otherwise insufficient as in the case of general milk. Specifically, an object of the present invention is to overcome the problems with the direct supply of natural taurine according to the prior art in which taurine can be degraded in the rumen and obstruct the rumen metabolism or the digestive metabolism after rumination, and to provide a method of producing taurine-enriched milk by supplying taurine precursors resistant to the rumen degradation.

Furthermore, it is an object of the present invention to provide milk having a high content of taurine by the above method. Natural taurine-enriched milk of the present invention is enriched in taurine which is otherwise insufficient in general milk in comparison with mother's milk. Thus, milk of the present invention is expected to be effective as functional milk beneficial to babies with high taurine requirements.

To achieve the objects as described above, the present invention provides a method of producing animal milk having a high taurine content, in which a precursor for taurine synthesis resistant to degradation in the rumen is prepared and fed to animals with concentrated foodstuffs, such that biosynthesis of taurine is induced by stimulation of a substrate.

In addition, the present invention provides milk which is increased in taurine content according to the above method of the present invention.

As used herein, the term "mature milk" means normal milk which is secreted after colostrum being secreted for 4 to 7 days after delivery of a milking cow and is constant in its components for about 300 days. The term "protected amino acids" means that precursor amino acids or derivatives thereof for biosynthesis of taurine are coated with additives including insoluble materials and fillers, such that they can be protected from degradation caused by enzymatic reaction of rumen microorganisms. A concrete example used in a preferred embodiment of the present invention is rumen protected DL-methionine (RP DL-Met) or rumen protected methionine hydroxy analogue (RP MHA). In addition, the term "rumen degradation" means that soluble protein and amino acids are degraded due to the rumen pH, and proteolytic activity and deamination activity of rumen microorganisms.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
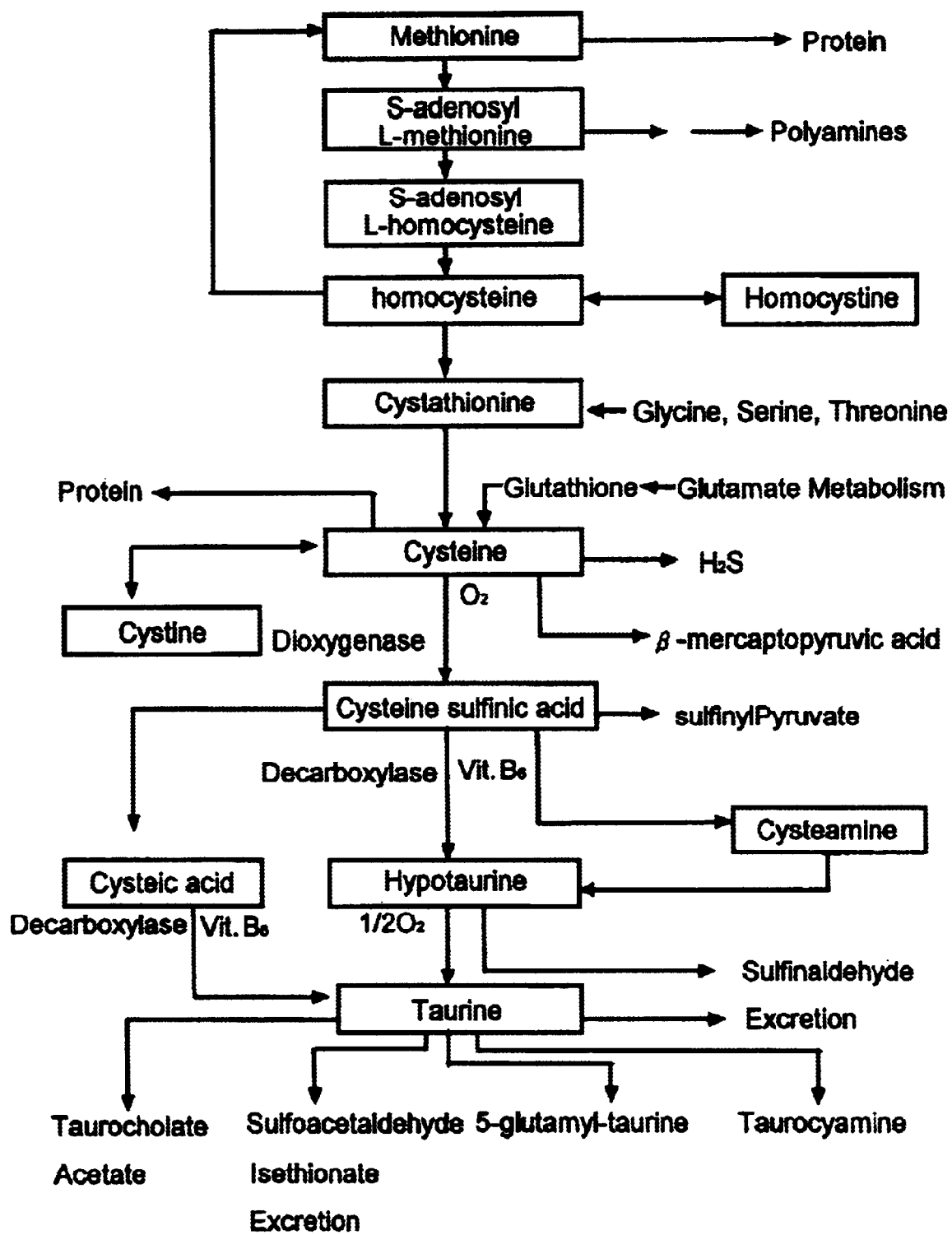
FIG. 1 shows a biosynthesis pathway of taurine produced from a precursor, such as methionine.

Hereinafter, a preferred embodiment of the present invention will be described in detail.

A method of producing milk having a high taurine content according to the present invention comprises the steps of:

(1) preparing precursors for taurine biosynthesis in the form of protected amino acids resistant to rumen degradation;

(2) feeding feedstuffs containing the protected amino acids to farm animals in a limited feeding manner, so as to breed the farm animals; and (3) milking the farm animals.

In the above method, methionine or methionine analogue is preferably used as a precursor for taurine biosynthesis. As the methionine analogue, there can be used N-acetyl-DL-methionine, benzoyl-L-methionine, N-phthalyl-DL-methionine, N-propionyl-DL-methionine, N-carbobenzoxy-DL-methionine, N-t-butyloxycarbonyl-L-methionine-dicyclohexyl ammonium salt, or N-t-butyloxycarbonyl-L-methionine-p-nitrophenyl-DL-methionine (W. Chalupa, *J. Diary Sci.* 58(8):1198–1218, 1974). As the methionine analogue, 2-hydroxy-4-methylthio butanoic acid ($C_5H_{10}O_3S$) can be preferably used. This compound has a chemical structure in which an amine group of methionine is substituted with a hydroxy group. Also, this compound is metabolized into methanethiol and dimethylsulfide which is known to be similar to methionine in metabolism of the rumen microorganisms. Methioine hydroxy analogue (MHA) is advantageous in that it has an inferior solubility in rumen fluid and is somewhat resistant to the rumen microorganisms, compared to DL-methionine. In addition, it is inexpensive and soluble in water, so that it is can easily applied in production processes. However, it is a strong acid of about pH 1.0 and limited in the amount that can be fed, so it needs to be neutralized with calcium hydroxide. For this reason, it is disadvantageous in that it requires calcium hydroxide in an amount more than that for RP DL-methionine, thereby reducing the core material content.

A source for amino acids absorbed in the small intestine of the ruminants includes protein synthesized by the rumen microorganisms, rumen-bypassed undegraded dietary protein, and endogenous secretion. In this regard, the endogenous secretion cannot have a direct influence on the amino acids, but the other two cases can be artificially controlled.

In the method of producing milk having a high taurine content, in order to render amino acids (taurine precursor) resistant to degradation in the rumen, there is used a process in which the additives including the insoluble materials and the fillers are blended with methionine, and the resulting blend is subjected to spray drying, fluidized bed drying, extrusion, and pelletizing, etc.

In order for methionine, a precursor for taurine synthesis, supplied together the concentrated foodstuffs, to be passed through the rumen, digested and absorbed in the small intestine and then to a lobule-alveolar-system, it must satisfy conditions where it is stable for 10 to 30 hours to the enzymatic action of microorganisms in the rumen of pH 5.3 and at the same time, eluted in the abomasum of pH 2.9 within two hours and absorbed in the small intestine.

In a preferred embodiment of the present invention, a pelletizing process is used to protect methionine from the rumen degradation. In the pelletizing process, hydrogenated beef tallow can be used, which is a main component rendering particles insoluble and is inexpensive. Also, it is solidified at less than 60° C. so that it is added at about 20 to 25% by weight relative to the total weight of the coating material. Moreover, the pellet may also contain calcium hydroxide ($Ca(OH)_2$) which serves to increase the pH of the core material and provides hardness to the core material upon bonding of the core material with the beef tallow, and hence is effective in reducing the solubility of the pellet in the rumen. In addition, the pellet may also contain an emulsifier and a defoamer. In a preferred embodiment of the present invention, polyglycerine fatty acid esters are used as the emulsifier, which has the effect of emulsifying the beef tallow and a gelatin solution. Also, the defoamer has defoaming and emulsifying effects upon preparation of the gelatin solution. Furthermore, the pellet may contain gelatin serving as an agent for bonding the beef tallow to methionine, as well as Vitamin E, an antioxidant.

Protected methionine which is a preferred example of protected amino acids used for the preparation of taurine-enriched milk is preferably prepared in the form of a spherical particle having a specific gravity of about 1.0 to 1.05 and a particle diameter of about 3 to 6 mm which is resistant to physical and mechanical impacts. For this purpose, about 60 to 70% by weight of methionine, about 20 to 25% by weight of hydrogenated beef tallow, about 5 to 10% by weight of starch and about 2 to 4% by weight gelatin are blended with each other. In other words, as the particle containing protected methionine has the composition and shape as described above, it is easily transported, stored and applied with other feedstuffs. In addition to this advantage, particle breakdown caused by mastication can be minimized and the amount of taurine precursor absorbed in the small intestine can be increased. The composition may additionally contain calcium hydroxide, a surface-active agent, an antioxidant and a defoamer. Also, for the homogenous mixing of methionine with the matrix materials, propylene glycol may be added to the composition, and for controlling the solidification rate of beef tallow, sugar palmitic acids may be added.

The process of preparing the palletized, protected amino acids comprises the steps of emulsifying hydrogenated beef tallow and a gelatin solution, mixing the resulting emulsion with methionine well, solidifying the mixture, mixing the solidified mixture for about one hour so as to obtain an uniform crystalline particle, adding starch to the mixture, forming the mixture into the shape of a pellet, and then drying the formed pellet at 50 to 60° C. for more than 25 hours so as to have a water content of less than 5%. Where methionine hydroxy analogue is substituted for methionine, it is preferred that the process of preparing the palletized, protected amino acids additionally comprises the step of first neutralizing the methionine hydroxy analogue with calcium hydroxide. In the above preparing process, dextrin may also be used instead of starch or gelatin.

In addition to the pelletizing process, there can also be used other processes, such as spray drying, extrusion, fluidized bed drying and the like. The spray drying process is the most preferred process for protection of amino acids from the rumen degradation, but this is disadvantageous in that it is difficult for methionine to be emulsified with a coating material due to its insoluble and, even though it is emulsified, the content of the core material is only 20%. In the extrusion process, the particle can be cracked in a heating step due to the melting point of beef tallow used as an insoluble material, so that breakdown of the particle can occur. Also, it is disadvantageous in view of bonding between methionine and beef tallow. Meanwhile, in the fluidized bed drying process, it is difficult to obtain a uniform particle since a particle size of methionine is different from that of the coating material. Also, this process is not preferred in view of economical efficiency because of lengthy and costly processing time. As a result, in order to accelerate the bonding of the coating material, including the insoluble material (e.g., fatty acid) and the filler, with methionine as the core material and to obtain a uniform particle, it is most preferred to use the pelletizing process as mentioned above.

In breeding farm animals by the supply of feedstuffs containing the precursor for taurine synthesis, it is preferred to conduct a limited feeding in which additives are fed only during milking together with concentrated feedstuffs, such that a given intake is continuously maintained. The feedstuffs are preferably supplied in such a manner that the taurine precursor resistant to the rumen degradation is fed at an amount ranging from 0.1 to 1.0% relative to a daily feeding amount of the total feedstuffs.

Although taurine-enriched milk which can be produced according to the method of the present invention includes various mammal milk, such as goat milk, sheep milk, antelope milk and the like, it is more preferred that the method of the present invention is applied to the production of processed milk which is consumed by a baby in large amounts.

In order to increase a content of taurine in milk using the protected amino acid prepared according to the above process, it is important that the protected amino acids have properties in that they are resistant to the rumen microorganisms and the rumen chemical decomposition and at the same time, is easily biologically absorbed. Accordingly, in order to find degradation and elution ratios of the matrix as prepared described above by enzymatic action of the rumen microorganism, the degree of protection of the matrix was examined in a buffer solution containing the rumen contents. The protection degree is obtained by measuring the amount of the active ingredients eluted from the imitative buffer solution and equals 100 minus the observed elution ratio in the test tube. The elution ratio is expressed by the percentage of the active ingredients eluted during the test. The test results for the protection degree indicate that RP-Met was protected in rumen at the amount of 60 to 64%, while RP-MHA was more than 70%. Also, the test results for the elution ratio of the matrix after passing through the rumen show that the elution ratio of RP-Met and RP-MHA in conditions of the abomasum and intestinal gastric juice is more than 90%. Therefore, it can be found that the feeding of the protected amino acids according to the present invention results in an increase in induction of taurine synthesis.

Moreover, from results of analysis of animal milk carried out by an amino acid analyzer, it could be found that the content of taurine in milk is increased, as biological taurine synthesis is increased by the supply of RP-Met and RP-MHA.

The present invention will hereinafter be described in further detail by examples. It should however be borne in mind that the present invention is not limited to or by the examples.

EXAMPLE 1

Preparation of DL-methionine Protected from Degradation in Rumen

Protected amino acids, a tautine precursor, were prepared, which are not degraded and effectively absorbed in the small intestine. In preparing the protected amino acids, a biologically available material with no effect on metabolism and nutrition, was used as the coating material at the minimum quantity, such that a blend ratio of methionine is more than 60%. Also, fatty acids were added so that methionine is resistant to an enzymatic action of the rumen microorganisms. The mixture containing methionine was formed into a spherical shape having a specific gravity of about 1.0 to 1.05 and a particle size of 3 to 6 mm, which is resistant to physical and mechanical impacts. This spherical particle is easily transported, stored and applied with other feedstuffs, and is minimized in particle breakdown caused by mastication. Table 1 below shows a composition of the protected methionine matrix.

TABLE 1

Composition of DL-methionine matrix protected from rumen degradation

| Components | Contents (%) |
| --- | --- |
| DL-methionine | 65.2000 |
| Hydrogenated beef tallow | 24.2000 |
| Starch | 7.0000 |
| Gelatin | 2.7000 |
| Calcium oxide | 0.4194 |
| Tween 80 | 0.3600 |
| Vitamin E | 0.1170 |
| Defoamer | 0.0036 |
| Total | 100.0000 |

First, hydrogenated beef tallow and a gelatin solution were emulsified at their melting point or more, thoroughly blended with methionine, and solidified. After that, in order to obtain a uniform crystalline particle, the blend was mixed for more than one hour in a mixer (KMX-3R Mixer, KOECO Industrial Co. Ltd.), and starch was added thereto. Next, the resulting mixture was formed in a granulator (Rotary Granulator 3HP, Youngjin Machine Co. Ltd.) and then dried at 50 to 60° C. for more than 24 hours, thereby obtaining the DL-methionine matrix having a water content of less than 5% and protected from the rumen degradation. This DL-methionine matrix was used in a feeding experiment as described later. Also, this particle has a DL-methionine content of 63% as measured by an iodine titration method in Example 3-1 below.

EXAMPLE 2

Preparation of MHA Protected from Rumen Degradation

Table 2 below shows a composition of protected methionine hydroxy analogue.

TABLE 2

| Components | Contents (%) |
|---|---|
| MHA | 55.492 |
| Beef tallow | 27.732 |
| Calcium hydroxide | 8.158 |
| Tween 80 | 8.158 |
| Dextrin | 0.460 |
| Total | 100.000 |

As methionine hydroxy analogue, Alimet sold by Novus Industrial Co., USA was neutralized with calcium hydroxide, and adjusted to a pH of more than 5.0. Then, this compound was uniformly mixed with beef tallow and dextrin in a mixer (KMX-3R Mixer, KOECO Industrial Co. Ltd.) for more than 1 hour. Then, the mixture is dried for more than 24 hours so as to have a water content of less than 5%. A content of MHA in the prepared RP MHA matrix was more than 57% as measured by an iodine titration method. The water content of 12% contained in MHA itself was believed to be removed through the drying step.

EXAMPLE 3

Experiment for Confirmation of Protection from Rumen Degradation 3-1) DL-methionine Titration Method Using Iodine ($I_2$)

0.2 to 0.6 g of a sample was dissolved in 100 ml of distilled water, and then, 50 ml of the resulting solution was introduced into a static flask, into which 50 ml of distilled water, 2 g of potassium phosphate ($KH_2PO_4$) and 2 g of KI were introduced and dissolved. Next, the resulting mixture was added with 50 ml of a 0.1 N $I_2$ solution, and the static flask was sealed and left to stand for 30 minutes. Thereafter, two or three drops of a starch reagent were added to the mixture which was then titrated with a 0.1 N sodium sulfate hydroxide solution. 0.1 ml of $I_2$ corresponds to 7.461 mg of methionine ($C_5H_{11}O_2NS$) and was used to evaluate the protection of methionine from rumen degradation and elution of methionine. In the case of MHA, MHA having a purity of 88% was titrated in the same manner as described above.

3-2) Evaluation of Protection Effect of Methionine from Rumen Degradation and Elution Ablity of Methionine 3-2-1) pH Stability In order to measure an elution ratio of methionine in the rumen, 5 g of a sample was introduced into 100 ml of a buffer solution corresponding to the rumen, and stirred for 16 hours at 37° C. with cultivation. Then, the supernatant was collected, and a content of methionine in the supernatant was measured by an iodine titration method.

Figure 3:
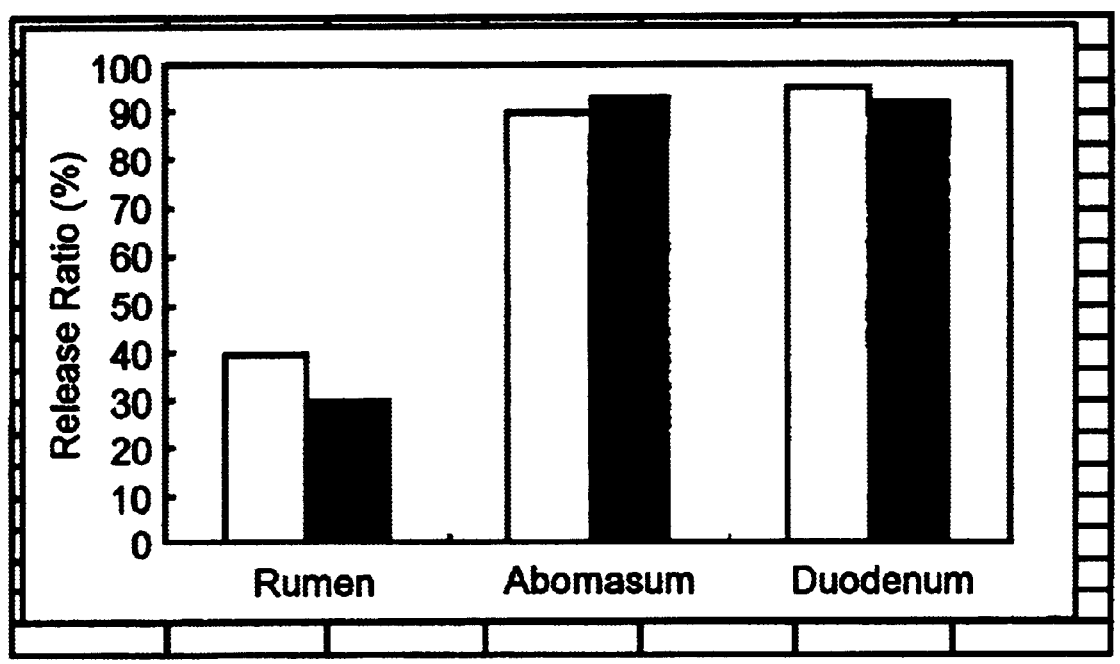
FIG. 3 shows results of the measurement of the protection rate of methionine in limitative buffer solutions containing rumen contents, carried out to examine a protection rate of methionine against an enzymatic action of rumen microorganisms after the feeding of amino acids, in which the white bars represent an elution ratio of RP DL-methionine and the black bars represent an elution ratio of methionine hydroxy analogue.

In order to measure the elution rate of methionine in the abomasum, 5 g of the solid portion remaining after the measurement of the elution rate in the rumen was isolated and added to 100 ml of a buffer solution. Then, the resulting solution was stirred for two hours at 37° C. with cultivation, after which a content of methionine was measured by an iodine titration method. Meanwhile, in order to measure an elution ratio of methionine in gastric juice of the small intestine, 5 g of a solid portion remaining after the measurement of the elution ratio in the abomasum was isolated and added to 100 ml of a buffer solution corresponding to the gastric juice of the small intestine. Then, the resulting solution was stirred for two hours at 37° C. with cultivation, after which the methionine content was measured by an iodine titration method. Results indicate that the elution ratio of RP DL-methionine and RP MHA in conditions corresponding to the abomasum and the gastric juice of the small intestine was more than 90% (see, FIG. 3).

3-2-2) Stability to Rumen Microorganisms

Figure 2:
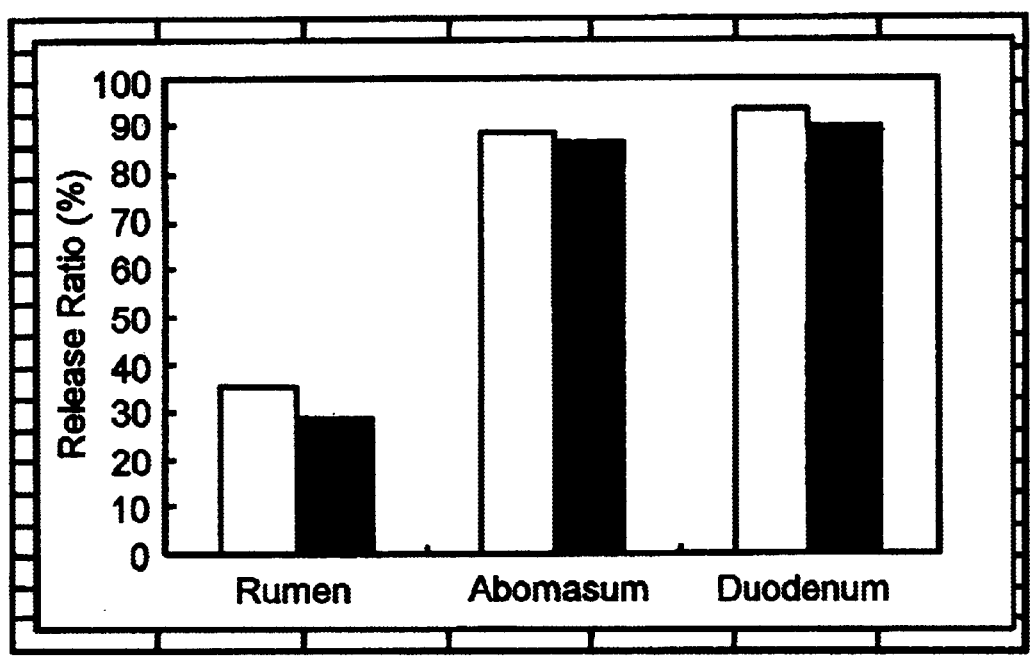
FIG. 2 shows results of the measurement of the protection rate of methionine in limitative buffer solutions, carried out to examine the protection rate of methionine against the rumen pH after the feeding of amino acids, in the which white bars represent an elution ratio of rumen protected DL-methionine (RP DL-methionine) and the black bars represent an elution ratio of methionine hydroxy analogue (RP MHA)

In order to examine the stability of methionine resistant to the rumen microorganisms and an elution ratio of methionine, the rumen contents of a Holsteine caw were extracted just it was slaughtered, and added to each of the limitative buffer solutions at the amount of 12%. The respective solutions were cultured in $CO_2$, and examined for the protective rates and the elution ratios of RP DL-methionine and RP MHA methionine. The protection effect was expressed in a ratio of the amount of amino acids excluding the amount of the eluted amino acids, relative to the total amount of supplied, protected amino acids. The results for the protection effect in the buffer solution containing the rumen contents indicate that RP-Met was protected in rumen at the amount of 60 to 64%, while RP-MHA was protected at the amount of more than 70% (see, FIGS. 2 and 3). These results are believed to be caused by the added amount of beef tallow used for providing hardness and reducing the solubility upon preparation of the amino acid matrix. Compositions of the limitative buffer solutions are indicated in Table 3 below.

TABLE 3

| Rumen buffer solution (1 liter) | Abomasum buffer solution (1 liter) | Duodenum buffer solution (1 liter) |
|---|---|---|
| $Na_2SO_4$ (2.5 g) | 3.2 N KCl (50 ml) | $NaHCO_3$ (9.8 g) |
| $K_2HPO_4$ (6.7 g) | 0.2 N NHCl (10 ml) | KCl (0.57 g) |
| | | $Na_2HPO_4$ (0.47 g) |
| | | $Na_2SO_4 7H_2O$ (0.12 g) |
| | | Cow bile powder (0.05 g) |
| | | Lipase (EC 3.1.1.3) (0.05 g) |
| pH 6.4 | pH 2.0 | pH 8.2 |

EXAMPLE 4

Feeding Test Using Amino Acids Protected from Rumen Degradation 4-1) Test Farm Animals and Test Period To carry out a feeding test using an RP-Met or RP-MHA matrix, 10–12 head of milking cows were selected and subjected to the feeding test for six weeks. The milking cows were divided into two groups. Group 1 was fed a control feedstuff with a concentrated feedstuff of 15 kg/day, and Group 2 was fed the concentrated feedstuff with either RP-Met or RP-MHA matrix of 60 g/day. Milk samples were taken from the respective groups before feeding of the additives and intervals of two weeks after feeding of the additives.

4-2) Effects of Feeding of Protected Amino Acids on Taurine Concentration in Milk In order to analyze the taurine content in milk, milk samples having a low taurine content and milk samples obtained after the feeding test of the additives were pretreated according to a method reported by M. A. Mehaia in *Milchwissenschaft*, 47(6), 1992, 351–353, and analyzed for taurine content using an amino acid analyzer.

500 μl of a milk sample was introduced into a 1.5 ml microependorf tube, to which 125 μl of a 20% sulfosalicylic acid solution was added. The resulting mixture was voltexed and then left to stand at 40° C. for 60 minutes. The mixture was centrifuged for 10 minutes at 14,000×g to remove protein, a precipitate, and the supernatant was collected, transferred into a clean tube, and analyzed using a 0.2 μm filter (PVDF Aerodisc 13, Gelaman Science), just before it was introduced into the amino acid analyzer. A concentration of amino acids in the milk sample was measured using the amino acid analyzer (Biochrom 20, Pharmacia LKB Biotech, Cambridge, England) based on an ion exchange column (Moore et al., *Academic Press, New York*, Vol. 6: 819–831, 1986). 40 μl of the pretreated sample was introduced into a lithium high performance column (90×4.6 mm, Pharmacia LKB Biotech) of the amino acid analyzer. A lithium citrate buffer, which had been stepwise increased in pH and ion concentration (0.2 M pH 2.80; 0.30M pH 3.00; 0.50 M pH 3.15; 0.90M pH 3.50; and 1.65 M pH 3.55), was used at a flow rate of 20 ml/hour as a moving phase.

Figure 4A:
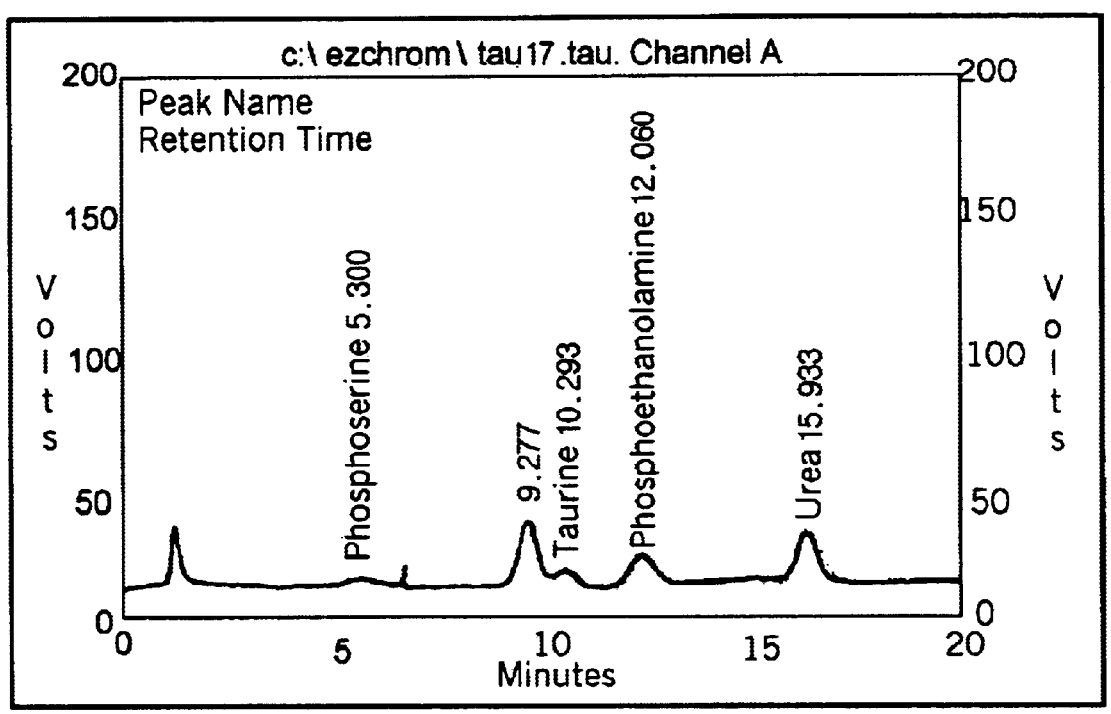
FIG. 4a is a chromatogram analyzed by an amino acid analyzer, for the taurine content in milk samples obtained from milking cows, after feeding them RP DL-methionine.
Figure 4B:
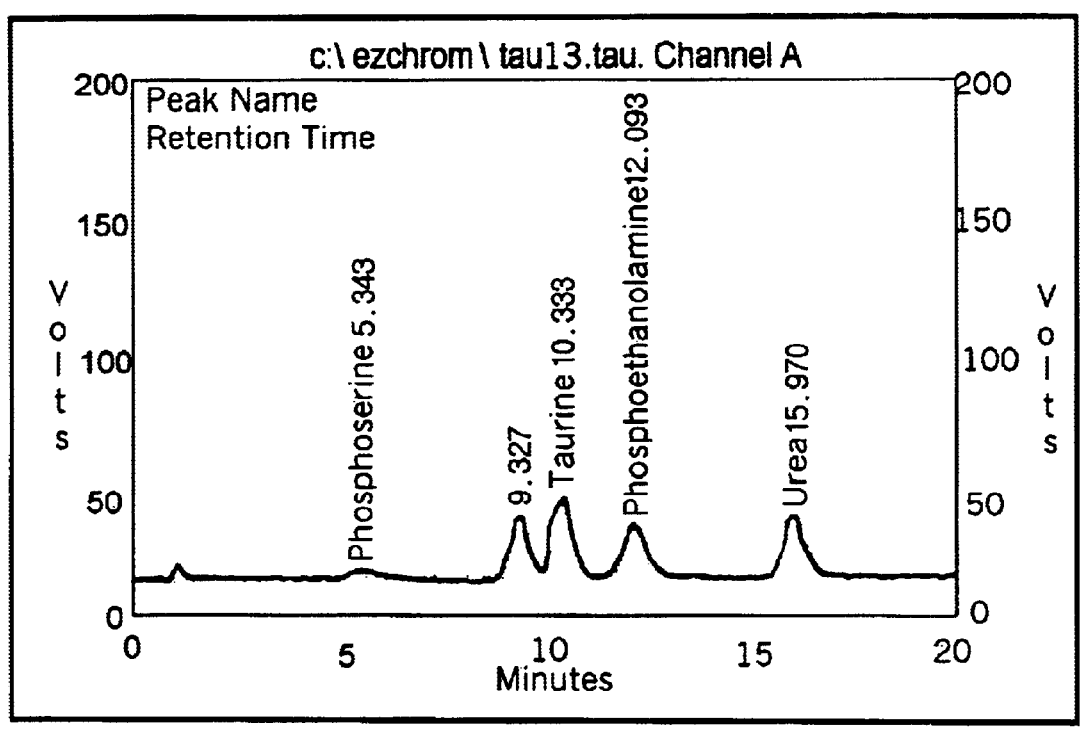
FIG. 4b is a chromatogram analyzed by an amino acid analyzer, for the taurine content in milk samples obtained from milking cows, after feeding them RP MHA.

The respective amino acids isolated through the column were reacted with ninhydrine to form purple materials which were then measured for absorbance at 440 nm and 570 nm. The resolution time of taurine was about 10.1 to 10.5 minutes (see, FIG. 4), and a concentration of amino acids in the respective samples was calculated from a comparison of the peak area obtained by introduction of a 0.5 mM standard amino acid solution (Sigma # A-6407 & A-1585), 20 μl, with the peak area obtained in the respective samples. As shown in FIGS. 4a and 4b, strongly acidic phosphoserine was flowed off from the column, and then taurine, phosphoethanolamine and urea were successively isolated. The time required for isolation was 188 minutes in total, and the time required for washing out and refitting of the column and introduction of the next sample into the column was 237 minutes. Taurine was isolated at a single peak isolated from peaks of phosphoethanolamine and phosphoserin, and featured in that unknown peaks appeared in the front of the taurine peak. The error coefficient of the cyclic test was less than 5%, and norleucine as an internal standard was added to the samples so as to compensate for losses generated during pretreatment and analysis of the samples.

Figure 5A:
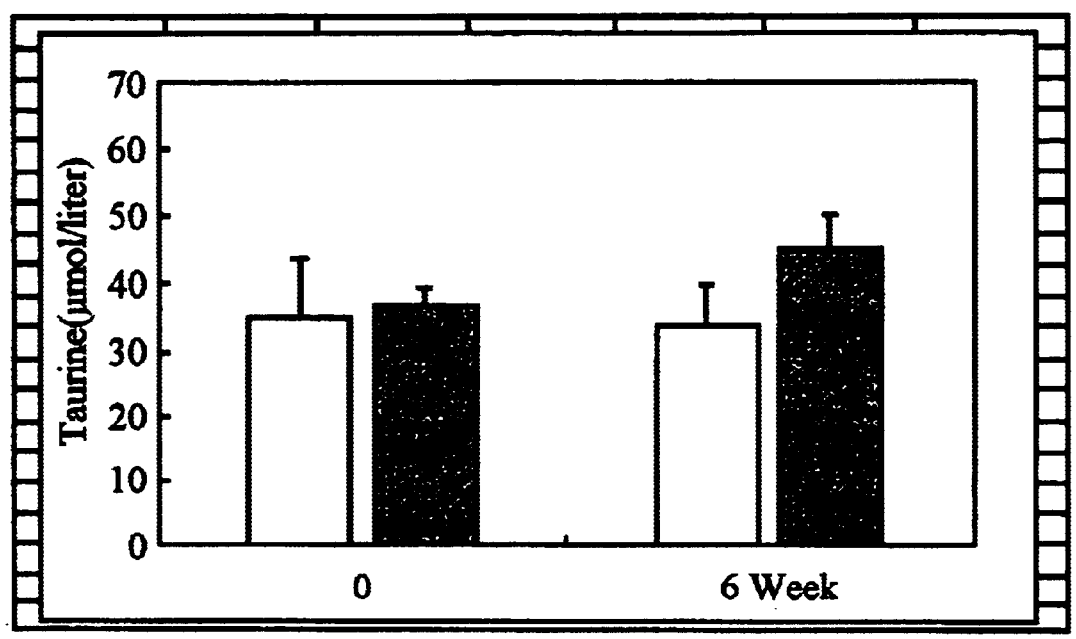
FIG. 5a shows changes in concentration of taurine in milk, after the feeding of RP DL-methionine.

In the RP-Met feeding test, concentration of taurine in the control group was 34.78±8.91 μmol/l in the sample before feeding, and 33.8±6.32 μmol/l at 42 days after feeding. The concentrations of taurine in the RP DL-Met matrix feeding group was 36.53±2.83 μmol/l in the sample before feeding, and 44.74±5.61 μmol/l after feeding, and were increased by about 23% in comparison with the control group (FIG. 5a).

Figure 5B:
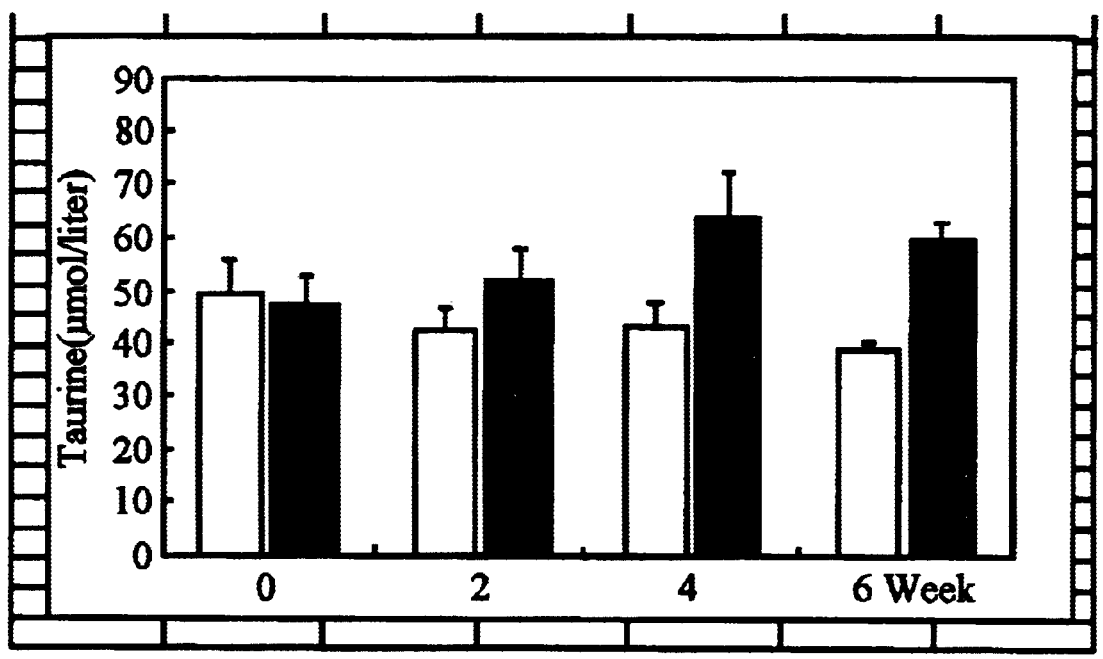
FIG. 5b shows changes in concentration of taurine in milk, after the feeding of RP MHA.

Meanwhile, in the RP-MHA feeding test, the concentration of taurine in the control group were 49.78±6.19 μmol/l in the sample before feeding, 49.78±6.19 μmol/l, 42.49±4.38 μmol/l, and 42.78±4.99 μmol/l in the samples taken at intervals of two weeks after feeding, and 38.64±1.63 μmol/l at 6 weeks after feeding. On the other hand, the concentration of taurine in the RP-MHA matrix feeding group was 46.95±6.19 μmol/l in the sample before feeding, 51.79±6.10 μmol/l and 63.32±8.85 μmol/l in the samples taken at intervals of two weeks after feeding, and 59.19±4.12 μmol/l at 6 weeks after feeding, and were significantly increased by about 53% in comparison with the control group (FIG. 5b).

In results of analysis for production amounts and compositions of the milk samples obtained in the RP-Met feeding test or RP-MHA feeding test, there were no significant differences. From the above results, it was found that, where the precursor for taurine synthesis is added to the feedstuffs in the form of a pellet or matrix resistant to degradation in the rumen and fed to the farm animals, the taurine content in milk is increased by virtue of an increase in in vivo taurine synthesis, although there are no significant changes in composition of milk protein or production amount of milk.

In the producing method of milk having a high content of taurine according to the present invention, the taurine precursor is prepared so as to resist the rumen degradation, and fed together with the concentrated feedstuffs such that the taurine synthesis is induced in vivo. As a result, the method of the present invention is economically efficient, and enables the problems of the rumen degradation and the metabolism obstruction to be solved. In addition, taurine-enriched milk according to the present invention has a higher taurine content than general milk, and hence, can be effectively used for the preparation of functional foods, specifically for babies that need to be fed with taurine.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of producing animal milk having a high taurine content, which comprises the steps of:

preparing a precursor for taurine biosynthesis in the form of protected amino acids resistant to degradation in a rumen;

feeding feedstuffs containing the protected amino acids to farm animals, so as to breed the farm animals; and milking the farm animals.

2. The method of claim 1, in which the precursor for taurine biosynthesis is methionine or methionine hydroxy analogue.

3. The method of claim 2, in which the methionine hydroxy analogue is 2-hydroxy-4-methylthio butanoic acid.

4. The method of claim 1, in which the protected amino acids resistant to the rumen degradation contains 60 to 70% by weight of methionine or methionine hydroxy analogue, as a core material, which is the precursor for taurine biosynthesis; and the protected amino acids are pelletized using 20 to 25% by weight of a fatty acid which is an insoluble material, 2 to 10% by weight of starch, dextrin or gelatin and about 0.1 to 10% by weight of calcium hydroxide, as coating materials.

5. The method of claim 4, in which the pellet further comprises one or more selected from the group consisting of a surface-active agent, an antioxidant and a defoamer.

6. The method of claim 4, in which the fatty acid is beef tallow.

7. The method of claim 6, in which the beef tallow is hydrogenated beef tallow.

8. The method of claim 1, in which the feedstuff feeding step 2) comprises the sub-steps of: mixing the protected amino acid pellet with the concentrated feedstuffs, and feeding the resulting feedstuffs to the farm animals only during milking such that the taurine precursor can be ingested at the amount of about 0.1 to 1% by weight relative to a daily feeding amount of the feedstuffs.

9. The method of claim 1, in which the animal milk is milk obtained from a cow, a horse, a goat, an antelope or a sheep.

10. A taurine-enriched animal milk produced according to claim 1.

11. A feed or drink composition containing the taurine-enriched milk of claim 10.

* * * * *